United States Patent [19]
Farrand et al.

[11] 4,215,938
[45] Aug. 5, 1980

[54] METHOD AND APPARATUS FOR CORRECTING THE ERROR OF A POSITION MEASURING INTERFEROMETER

[75] Inventors: Clair L. Farrand, Bronxville; Vincent F. Foster, New Rochelle; William H. Grace, Thornwood, all of N.Y.

[73] Assignee: Farrand Industries, Inc., Valhalla, N.Y.

[21] Appl. No.: 946,465

[22] Filed: Sep. 28, 1978

[51] Int. Cl.³ .......................................... G01B 11/02
[52] U.S. Cl. .................................... 356/358; 356/351
[58] Field of Search ................ 356/345, 349, 351, 358

[56] References Cited
U.S. PATENT DOCUMENTS

| | | | |
|---|---|---|---|
| 3,458,259 | 7/1969 | Bagley et al. | 356/351 X |
| 3,647,302 | 3/1972 | Zipin et al. | 356/349 |
| 3,656,853 | 4/1972 | Bagley et al. | 356/351 X |

Primary Examiner—John K. Corbin
Assistant Examiner—Scott J. Sugarman
Attorney, Agent, or Firm—John L. Downing

[57] ABSTRACT

Apparatus for correcting the error of a position measuring apparatus, the apparatus having a first measuring interferometer path of variable length and a second interferometer monitoring path of fixed length. Means are provided for monitoring the change in the optical path length of the monitoring interferometer due to environmental changes and for reflecting these changes in the indicated measurement of the measuring interferometer.

4 Claims, 2 Drawing Figures

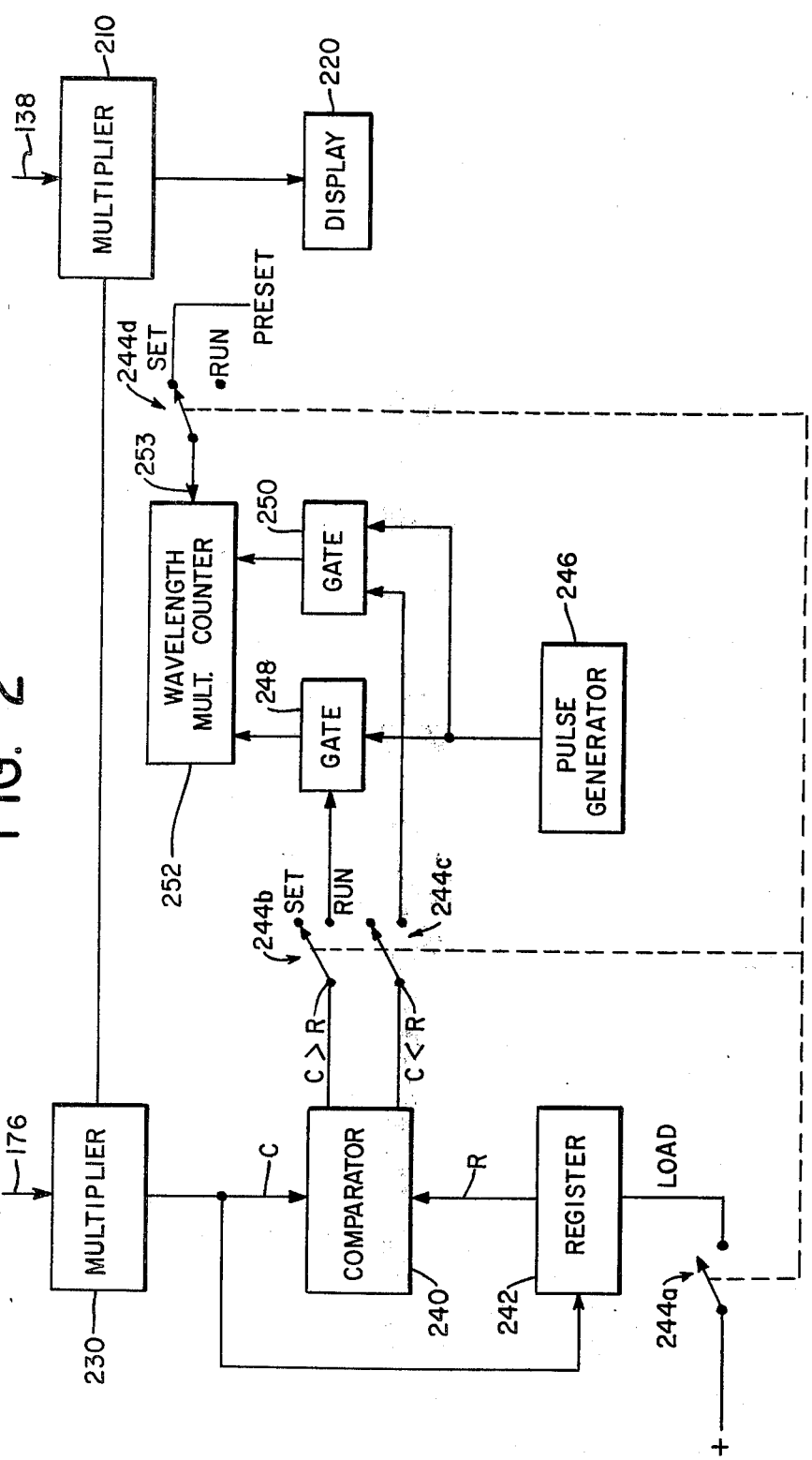

METHOD AND APPARATUS FOR CORRECTING THE ERROR OF A POSITION MEASURING INTERFEROMETER

FIELD OF THE INVENTION

This invention relates to interferometric method and apparatus for the measurement of position and distance, and more particularly for position and distance measuring interferometric method and apparatus having means for the correction of measurement errors introduced by variations in the temperature, air pressure, humidity and other characteristics of the environment of the apparatus.

BACKGROUND OF THE INVENTION

Interferometers capable of measuring distance are well known in the prior art. Although the present invention is applicable to interferometers generally, one type of interferometer representative of the current state of the art is described in Bagley et al., U.S. Pat. No. 3,458,259, issued July 26, 1969, and this type of interferometer is shown in conjunction with the specific embodiment of the invention described and claimed hereinafter.

As noted above, distance measuring interferometers are subject to environmental effects, particularly to changes in air pressure, temperature and humidity. Such factors tend to alter the wavelength of the beam of light used by the interferometer to measure distance.

In the past, it has been possible to correct the environmental errors by using individual sensors for the barometric pressure, temperature and humidity and using the measurements for the correction of the variable length interferometric measuring path. This has been only partly satisfactory due to the sensor unreliablilty, their errors and errors of their application.

The present invention solves this problem by directly measuring these effects upon an optical path of fixed length and applying the measurement to correct the corresponding errors of the variable length path.

It is a further purpose of the present invention to automatically correct the distance measuring interferometer by producing a signal indicative of the number of interferometer light wavelengths in a path of predetermined fixed length, and applying that signal to correct the indicated number of interferometer wavelengths in a measuring path of variable length.

SUMMARY OF THE PRESENT INVENTION

The features of this invention are producing a signal from an interferometric path of fixed length representing the environmental atmospheric errors of the interferometer and using this signal to correct the corresponding errors of the variable length interferometric measuring path, and also producing a signal representing the errors due to the variation of length of the fixed length optical path caused by temperature changes of the material of the interferometer and using this signal to correct the corresponding errors due to the temperature effects on the material of the variable length measuring path.

As will become clearer in the description of the specific embodiment hereinafter, the interferometric system described in the Bagley et al., U.S. Pat. No. 3,458,259 is of a type in which a portion of a first laser light beam and a portion of a second laser light beam of a different optical frequency are mixed by a photoelectric device to produce an electrical reference signal having a countable intermediate frequency.

Another portion of the first laser light beam traverses a fixed optical path of an interferometer, and another portion of the second laser light beam traverses a variable length optical path of the interferometer. These other portions of the first and second laser light beams are mixed by another photoelectric device to produce an electrical information signal having the same countable intermediate frequency as the reference signal only while the variable length of the optical path is not being changed.

A reversible counter integrates the difference in frequency between the reference and information signals while the optical length of the variable length optical path is being changed to indicate the change in length of the variable length optical path.

The present invention is based on the discovery that the atmosphere's change in wavelength produces the same effect in an interferometer of fixed length path as moving the reflector used in a variable length path interferometer for measurement.

In the Bagley system the Doppler frequency changes so produced ultimately result in velocity and position changes.

In the present invention when these error quantities are measured in a path of fixed length they are automatically applied to correct the errors of the variable length measuring path.

This correction is made by employing a reversible counter termed, for convenience, a Wavelength Multiplier Counter which creates a percentage of the current wavelength to the ideal wavelength of light in vacuum.

The following are the steps of procedure used at the time of initiating measurements:

(1) The variable length measuring path is set at a known dimension.

(2) The length of the measuring path including errors is noted.

(3) The wavelength counter is manually adjusted until no error is noted.

(4) The error of the fixed length optical path is currently applied to correct the length of the variable measuring path.

(5) When the application is by servo the error is now corrected currently.

This measurement of the errors of the path of fixed length includes both the atmospheric errors and the errors due to temperature variation changing the length of the fixed length optical path. This length is standardized for 20° Celsius by means of gauge blocks and, even though measurements are made at other temperatures, if the fixed length path is mounted on steel and the variable length path is mounted on steel and the gauge blocks are of steel, the measurements will always be correct when made at 20° C. This is also true for any metal chosen.

In summary, in addition to the variable length optical path described above in connection with the Bagley et al., apparatus, the present invention introduces a second, fixed predetermined interferometer optical path together with electronic means for comparing the indicated distance of the fixed, predetermined optical path with the indicated distance of the variable optical path and for altering that indicated variable distance accordingly, so that the aggregate effects of the atmospheric environment which influence the indicated fixed, predetermined path are utilized in one operation to correct the indicated measurement of the variable length optical path.

Specifically, the present invention provides a method for correcting distance measuring interferometric apparatus in a medium subject to environmental changes, said apparatus having measuring and monitoring beams of light, the method comprising the steps of:

(a) directing said measuring beam of light through a first interferometer towards a first reflector, said first reflector being spaced at a variable distance from said first interferometer, said first interferometer having means associated therewith for the measurement and indication of the light path distance between said first interferometer and said first reflector, and (b) directing said monitoring beam of light through a second interferometer spaced at a fixed, predetermined distance from a second reflector, said second interferometer having associated therewith means for the measurement and indication of the light path distance between said second interferometer and said second reflector;

(c) measuring over a period of time the change in the monitoring light path distance as indicated by said second interferometer due to changes in the environment, said change having either a positive or a negative direction; and (d) multiplying the indicated measuring light path distance of said first interferometer by a correction factor in which the numerator is the fixed, predetermined distance and the denominator is the sum of said fixed, predetermined distance and the change in the observed monitoring light path indicated by said second interferometer.

The invention further provides interferometric apparatus having measuring and monitoring beams of light, said apparatus comprising:

(a) a first interferometer through which said measuring beam of light is directed toward a first reflector, said first reflector being spaced at a variable distance from said first interferometer;

(b) first measuring means associated with said first interferometer for the measurement and indication of the measuring light path distance between said first interferometer and said first reflector;

(c) a second interferometer through which said monitoring beam of light is directed toward a second reflector, said second reflector being spaced at a fixed, predetermined distance from said second interferometer;

(d) second measuring means associated with said second interferometer for the measurement and indication of the monitoring light path distance between the second interferometer and the second reflector;

(e) means for accumulating the change over a period of time of the monitoring light path distance as measured by said second measuring means, said change being caused by variation of the environment of said apparatus; and (f) correction means responsive to said accumulating means and connected to said first measuring means for correcting said indicated measuring light path distance by multiplying said indicated measuring light path distance by a correction factor corresponding to said fixed, predetermined distance divided by the sum of said fixed, predetermined distance and said change of said monitoring light path distance.

BRIEF DESCRIPTION OF THE DRAWING

FIG. 2 shows a schematic diagram of electronic apparatus used in conjunction with the interferometric system shown in FIG. 1.

DESCRIPTION OF A SPECIFIC EMBODIMENT

Figure 1:
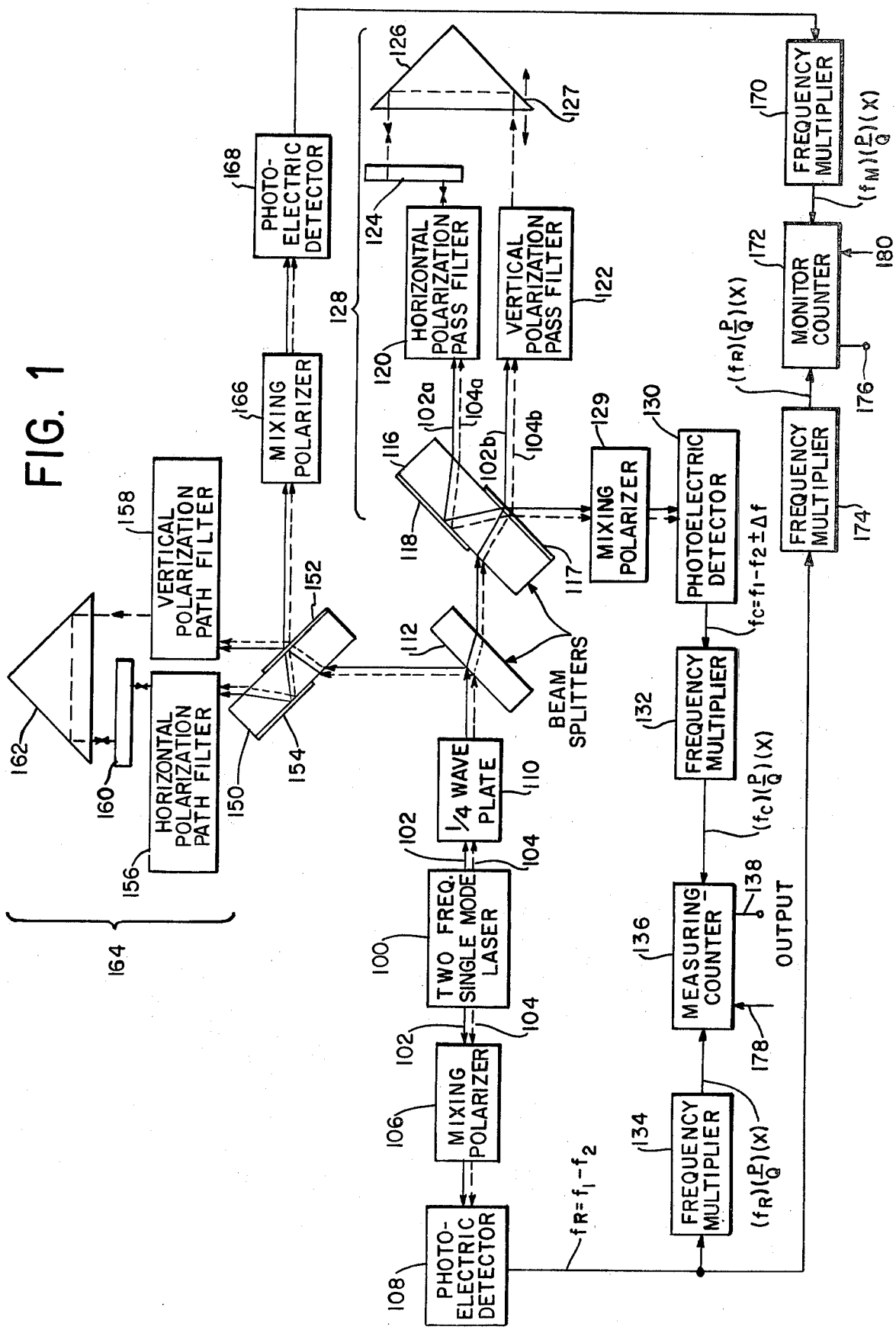
FIG. 1 shows a schematic diagram of a specific embodiment of an interferometric system similar to that shown in Bagley U.S. Pat. No. 3,458,259 having both an optical path of variable length and an optical path of predetermined, fixed length.

FIG. 1 shows a schematic diagram of an interferometer system using the elements shown and described in the aforementioned Bagley, et al. U.S. Pat. No. 3,458,259, and having two optical paths; a measuring path for measuring the light path distance along a variable path, and a monitoring path for measuring the light path distance along a nominally fixed, predetermined path.

Specifically, a two frequency single mode laser 100 produces a beam of light including a first component 102 having a frequency $f_1$ and a second component 104 having a frequency $f_2$ that differs from the frequency $f_1$ by a countable intermediate frequency, such as five hundred kilohertz. This two frequency single mode laser 100 can comprise a plasma tube laser having spaced internal mirrors which are mounted within the plasma tube opposite one another and perpendicular to the axis of the plasma tube so as to allow all polarizations to be amplified directly, and having a magnetic field superimposed along the plasma tube so as to produce right-hand and left-hand circularly polarized light components 102 and 104 of different frequency. A mixing polarizer 106 is mounted in an optical path traversed by the parallel and overlapping light beams 102, 104 for mixing these beams to provide each beam with a component of similar polarization. These similarly polarized components are mixed by a photoelectric detector 108 having, for example, a square law detecting characteristic, to produce an electric reference signal having a frequency $f_R$ of 500 kilohertz, the difference in optical frequency between the light beams 102 and 104.

A one-quarter wave plate 110 is mounted in another optical path traversed by the circularly polarized light beams 102, 104 so as to change the right-hand polarization of the beam 102 to linear horizontal polarization, and the left-hand circular polarization of the beam 104 to linear vertical polarization. A beam-splitter 112 is also mounted in that path so as to direct a portion of the beam through the beam-splitter 112 toward a second beam splitter 116; a second portion of the beam is directed, as will be described hereinafter, to another beam splitter 152 mounted at a 90° angle to the beam splitter 116.

The beam splitter 116 of a measuring interferometer 128 comprises a fifty percent reflecting mirror 117 that is formed in the path of the parallel and overlapping light beams 102, 104 on the back face of the optically flat glass plate 116 having parallel front and back faces and being oriented at an angle of about 45 degrees with respect to a reference plane normally intersecting these light beams 102, 104.

A one hundred percent reflecting mirror 118 is formed on the front face of beam-splitter 116 in the first inerferometric optical path traversed by the reflected portion of each light beam 102, 104 for reflecting these reflected portions 102a and 104a along a portion of this first interferometric path that is parallel to a first portion of a second interferometric path to a horizontal polarization path filter 120 mounted in this portion of the measuring interferometer optical path 128. The horizontal polarization path filter 120 absorbs the incident polarization 104a of the light beam 104 of vertical polarization and passes the incident beam 102a of the light beam 102 of horizontal polarization.

A reflector 124 is also mounted in the first interferometric path for reflecting the passed portion 102a of the light beam 102 of horizontal polarization back along the first optical path to the beam splitter 116.

A vertical polarization path filter 122 is mounted in the first portion of the second interferometric path of the measuring interferometer 128 for absorbing the incident portion 102b of the light beam 102 of horizontal polarization and for passing the incident portion 104b of the light beam 104 of vertical polarization of a retroflector 126 that is also mounted in the second interferometric path. This retroflector 126 is mounted for translational movement, as generally indicated at 127, so that the optical length of the second optical path of the measuring interferometer 128 may be changed. The retroreflector 126 reflects the passed portion 104b of the light beam 104 of vertical polarization along a spaced and parallel second portion of the second interferometric path to the back side of the reflector 124 from which it is reflected back along the second interferometric path to the beam splitter 116.

The light beam portions 102a and 104b that are reflected back along the first and second interferometric paths to the beam splitter 116 are partially transmitted and reflected by the beam splitter 116 in parallel and overlapping relationship to a mixing polarizer 129. The mixing polarizer 129 mixes the parallel and overlapping light beam portions 102a and 104b to provide each of these portions with a component of similar polarization. These similarly polarized components are mixed by a photoelectric detector 130 so as to produce an electrical comparison signal having a frequency $f_c$ that equals the frequency $f_R$ (500 kilohertz) of the reference signal (which is the output of the photoelectric detector 108) only so long as the retroflector 126 is not being moved.

The output 109 of the reference photoelectric detector 108 and the output of the measuring photoelectric detector 130 may be directly connected to a reversible one megahertz counter 136 for positively counting the frequency $f_R$ of the reference signal and for negatively counting the measuring frequency $f_c$ of the comparison signal while the retroflector 126 is being moved so as to continuously indicate the change in phase of the second interferometric path relative to the first interferometric path and hence the change in optical length of this second optical path in units of light wavelength. However, the resolution of this interferometric system for measuring length may be substantially improved by connecting a frequency multiplier 132 between the output of the photoelectric detector 130 and the countdown input of the reversible counter 136 and by connecting another frequency multiplier 134 between the reference signal $f_R$ and the count-up input of the reversible counter 136. These frequency multipliers 132 and 135 multiply the frequencies of the comparison signal and reference signal by a rational fraction P/Q, where P is an integer and Q is a smaller integer. Thus, if a one-quarter wavelength interferometer 128 is used, a change of only Q/4P light wavelength in the optical path of the second interferometric path produces a unit change of one cycle (that is, of one hertz per second) in the frequency $f_c$ of the comparison signal relative to the frequency $f_R$ of the reference signal while the retroflector 126 is being moved.

The portions of the light beams 102 and 104 emanating from the quarter wave plate 110 which are reflected at a 90° angle from the beam splitter 112 are directed toward a monitoring interferometer 164 which is substantially similar to the measuring interferometer with only one significant exception, that is, that the retroflector 162 of the monitoring interferometer 164 is not mounted for any translational movement, but is fixed at a predetermined distance from the other components of the monitoring interferometer.

Thus, the portions of light beams 102 and 104 which strike a beam splitter 150 with its reflector portions 152 and 154 react in exactly the same manner as that described above in connection with the beam splitter 116 and its reflectors 117 and 118. Horizontal and vertical polarization path filters 156 and 158 are identical to path filters 120 and 122, respectively. Similarly, reflector 160 is identical to the reflector 124. Retroreflector 162 is identical to the retroreflector 126, but to repeat, retroreflector 162 cannot be intentionally moved, but is mounted at a fixed, predetermined optical path distance from the other optical components of the monitoring interferometer 164.

The light beam portions that are reflected back to the beam splitter 150 are partially reflected in parallel and overlapping relationship to a mixing polarizer 166 which mixes each of these portions to provide them with a component of similar polarization. These similarly polarized components are mixed by a photoelectric detector 168 to produce an electrical monitoring signal having a frequencing of $f_M$ which varies from the reference frequency $f_R$ only when the environment of the monitoring interferometer varies so as to alter the apparent optical path distance between the retroreflector 162 and the other elements of the monitoring interferometer 164. As described above, such factors as air temperature, pressure and humidity all tend to change the optical path distance of an interferometer as measured in wavelengths of light.

The electrical output of the photoelectric detector 168 proceeds to a frequency multiplier 170, and thence to the negative input of a reversible counter 172. The reference electrical signal $f_R$ on line 109 is connected to another similar frequency multiplier 174 and thence to the positive input of the reversible counter 172. Each of the reversible counters 136 and 172 has a pulse or thumbswitch input 178 and 189, which can set the counter 136, 172 to any desired count state.

Reviewing FIG. 1, it will be seen that two interferometers, each having the same light source are illustrated. A measuring interferometer 128 is shown together with elecrical components which produce an electrical signal at the output 138 of a counter 136 whenever the retroreflector 126 of the measuring interferometer 128 is being moved. Similarly, a monitoring interferometer 164 excited by the same light source is shown together with electrical components which generate an electrical signal at the output 176 of a counter 172 whenever atmospheric conditions are changing so as to vary the effective number of light wavelengths in the otherwise fixed optical path of the monitoring interferometer 164.

FIG. 2 illustrates a schematic diagram of the electronic apparatus connected to the interferometric elements of FIG. 1 which serve to correct the measurement indicated by the measuring interferometer 128 in accordance with the environmental factors detected by the monitoring interferometer 164. In FIG. 2 is shown an electronic multiplier 210 whose function will be described hereinafter, having as one input the output 138 of the counter 136 associated with the measuring interferometer 128. The output of the multiplier 210 is connected to a visual display 220 which indicates the final, corrected output of the measuring interferometer 128.

The output signal 176 from the monitoring interferometer counter 172 is connected to one input of another electronic multiplier 230, and the output signal C of that multiplier 230 is transmitted to a first input of a comparator 240. The output C of the multiplier 230 is also connected to a register 242 whose output is sent to the other input of the comparator 240. The comparator 240 has two outputs, C>R and C<R.

A four pole, double throw switch 244a–d is shown in FIG. 2 with all contacts indicated in the "set" position; the other position of the switch 244a–d is designated "run".

A pulse generator 246 having, for example, a pulse output of one pulse every eight seconds is connected to two "and" gates 248 and 250 whose outputs are respectively fed to the negative and positive inputs of a reversible counter 252. The state of the reversible counter 252 is known as the wavelength multiplier and is transmitted to the other inputs of multipliers 210 and 230. The reversible counter 252 can be preset to a desired count when the switch 244d is in the "set" position, as shown in FIG. 2. "And" gate 248 is gated by the C>R signal when switch 244b is in the "run" position; similarly, gate 250 is opened by the C<R signal when switch 244c is in the "run" position. During the "run" phase of operation the register 242 is momentarily loaded by the output C of the multiplier 230 by means of the load signal through switch 244a.

In operation, the interferometric apparatus is first arranged so that the retroreflector 162 of the monitoring interferometer 164 is spaced from the other elements of the interferometer at a precise, fixed distance, for example by means of a five inch (12.70 cm.) gage block. This known, fixed monitoring path is preset into the reversible counter 172 by means of the input 180. Any change in the measured length of this nominally fixed path will be due to changes in the environmental condition. The output of the counter 172 is multiplied by the multiplier 230 to produce the signal C.

The correct initial environmental factor is determined as follows. The switch 244a –d is set to the "set" position, which thereby opens the feedback loop of the apparatus by disconnecting the inputs to the gates 248 and 250 and by enabling the reversible counter to be preset.

The retroreflector 126 of the measuring interferometer 128 is now moved accurately by a known distance, for example by means of a ten inch (25.4cm.) gage block and the counters 136 and 252 are changed by means of signals on inputs 138 and 253 until the display 220 exactly corresponds to the distance the retroreflector 126 is moved. The environmental correction factor is then correct for the existing conditions.

When the switch 244a–d is thrown to the "run" position the preset input 253 of the counter 252 is disabled, and the feedback loop of the electronic apparatus is closed by connecting the C>R and C<R signals to the pulse gates 248 and 250, respectively; and the signal C is loaded into the register 242. This action causes the environmental correction factor to increase or decrease periodically as environmental changes cause signal 176, and hence signal C to change until the signal C equals the signal R. This environmental correction factor (the output of the counter 252) is transmitted to the multiplier 210 so that the display 220 is continually updated for environmental changes, and correspondingly displayed by the visual display 220.

What is claimed is:

1. Interferometric apparatus having measuring and monitoring beams of light, said apparatus comprising:
    (a) a first interferometer through which said measuring beam of light is directed, said first interferometer having a light path whose length through the environment can be varied by moving an associated first reflector with respect to the other first interferometer components;
    (b) first measuring means associated with said first interferometer for the measurement and indication of the measuring light path distance between said first reflector and said other first interferometer components;
    (c) a second interferometer through which said monitoring beam of light is directed, said second interferometer having a light path whose length through the environment is fixed and predetermined by fixing an associated second reflector with respect to the other second interferometer components;
    (d) said measuring means associated with second interferometer for the measurement and indication of the monitoring light path distance between the second reflector and said other second interferometer components;
    (e) means for accumulating the change over a period of time of the monitoring light path distance as measured by said second measuring means, said change being caused by variation of the environment of said apparatus; and
    (f) correction means responsive to said accumulating means and connected to said first measuring means for correcting said indicated measuring light path distance by multiplying said indicated measuring light path distance by a correction factor corresponding to said fixed, predetermined distance divided by the sum of said fixed, predetermined distance and said change of said monitoring light path distance.

2. The apparatus according to claim 1 wherein said first interferometer has first accumulator means associated therewith; means for accumulating the number of light wavelengths in the optical path of said first interferometer as said first reflector is moved, and for generating a first electric signal representing said number of wavelengths; and said second interferometer has associated therewith second accumulator means for accumulating the number of light wavelengths in the optical path of said second interferometer as said optical path is affected by variations in the environment, and for generating a second electric signal representing said number of wavelengths; and means for comparing said second electrical signal with a predetermined signal and for generating two comparison signals as a result of said comparison; means for periodically transmitting one of said two comparison signals to one of two inputs, said inputs being additive and substractive, respectively, to a wavelength multiplier having an electrical signal output; and multiplier means for altering said first electrical signal by said output signal from said wavelength multiplier and for generating a final output signal suitable for submission to a display apparatus.

3. Apparatus for correcting the error of a position measuring interferometer due to changes in the ambient environment, said interferometer having two paths:
   (a) a first monitoring path of fixed, predetermined length,
   (b) a second measuring path of variable length, and
   wavelength detection and multiplying means for both paths, comprising:
   means for indicating the measured error of the monitoring path, and
   means for adjusting the multiplying wavelenth means so that the error of the monitoring path is a minimum, thereby providing means for simultaneously adjusting both multiplying means, correcting the error of the monitoring path and the error of the measuring path.

4. A method for correcting distance measuring interferometric apparatus in a medium subject to environmental changes, said apparatus having measuring and monitoring beams of light, the method comprising the steps of:
   (a) directing said measuring beam of light through a first interferometer, said first interferometer having a light path whose length through the environment can be varied by moving an associated first reflector with respect to the other components of said first interferometer, said first interferometer having means associated therewith for the measurement and indication of the light path distance between said first reflector and said other first interferometer components;
   (b) directing said monitoring beam of light through a second interferometer, said second interferometer having a light path whose length through the environment is fixed and predetermined by fixing an associated second reflector with respect to the other components of said second interferometer, said second interferometer having associated therewith means for the measurement and indication of the light path distance between said second reflector and said other second interferometer components;
   (c) measuring over a period of time the change in the monitoring light path distance as indicated by said second interferometer due to changes in the environment, said change having either a positive or a negative direction; and
   (d) multiplying the indicated measuring light path distance of said first interferometer by a correction factor in which the numerator is the fixed, predetermined distance and the denominator is the sum of said fixed, predetermined distance and the change in the observed monitoring light path indicated by said second interferometer.

* * * * *